(No Model.)
A. C. DARRAGH.
OIL FILTER.
No. 493,073. Patented Mar. 7, 1893.
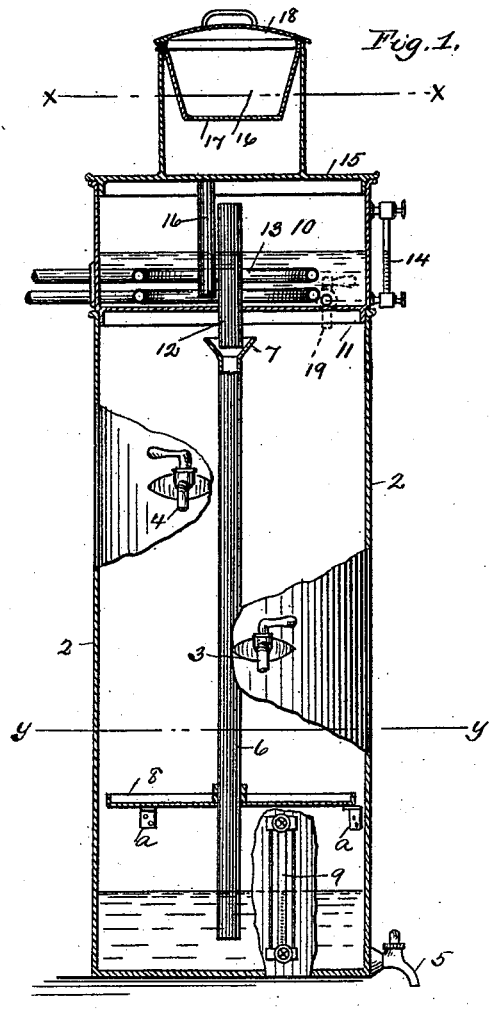
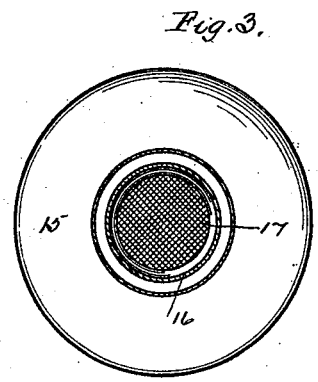
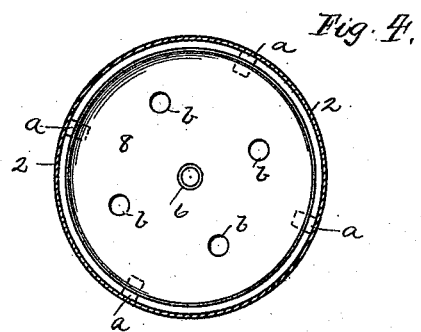
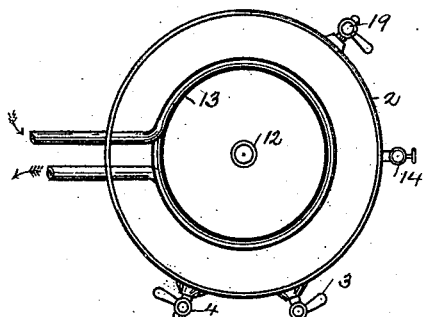
Witnesses:
J H Beal
W. E. Harrison
Inventor.
Albert C. Darragh,
by Wm. L. Pierce,
his attorney.

UNITED STATES PATENT OFFICE.

ALBERT C. DARRAGH, OF ALLEGHENY, PENNSYLVANIA.

OIL-FILTER.

SPECIFICATION forming part of Letters Patent No. 493,073, dated March 7, 1893.

Application filed April 29, 1892. Serial No. 431,201. (No model.)

*To all whom it may concern:*

Be it known that I, ALBERT C. DARRAGH, a citizen of the United States, residing at Allegheny, in the county of Allegheny and State of Pennsylvania, have invented or discovered a new and useful Improved Oil-Filter, of which the following is a specification.

In the accompanying drawings which make part of this specification, Figure 1, is a vertical section partly in elevation of my filter. Fig. 2 is a plan of the same with cover removed. Fig. 3 is a section on line $x$—$x$ of Fig. 1, and Fig. 4, a section on line $y$—$y$ of Fig. 1.

The purposes of my invention generally stated are to devise a combined oil filter and reservoir in which the oil shall be purified without any other filtering agencies than water and heat. Secondly, to provide opportunity for the oil to be cooled after treatment before it is drawn from the filter and third, in certain details of construction which insure simplicity cheapness and easy cleaning.

My filter shown in the drawings which make part of this specification is built as follows, viz:

2 is a cylindrical shell preferably of galvanized steel forming the body of the filter. Said shell is provided with faucets 3 and 4 to draw off the purified oil at different depths and of different gravity and 5 to cleanse the bottom of the filter.

6 is a standpipe running from near the bottom of the filter nearly to its top and provided at the latter point with a funnel 7.

8 is a circular sediment tray secured to the stand pipe and resting as seen in the drawings on lugs $a$—$a$ secured to the inside of the shell of the heater. Said tray is almost of equal diameter with the filter leaving a narrow annular opening between its periphery and the shell. The tray is also pierced with several openings $b$—$b$.

9 is a water gage. The refining chamber 10 is likewise best made of galvanized steel and is an open mouthed cylinder having at its bottom a flange 11, to slip within the shell 2.

12 is a pipe extending through the bottom of the refining chamber into the mouth of the funnel 7. Said pipe 12 extends nearly to the top of said refining chamber.

13 is a steam coil in the refining chamber and 14 a water gage.

19 is a draining valve for the refining chamber.

15 is the lid of the refining chamber having depending therefrom the short pipe 16 reaching nearly to the bottom of the refining chamber. Upon said lid 15, is the receiver 16, which contains a strainer 17.

18 is the cover for the receiver.

The operation of the filter is as follows: The bottom of the filter is filled with water to the depth of say six inches. The refining chamber then receives a like depth of water. The dirty oil is then poured in through the receiver's strainer and through the pipe 16 into the refining chamber. Steam is then admitted into the steam coil and the oil is heated desirably for about six days. During this heating the oil becomes lighter and of less consistency and the heavy impurities it carries fall through it to the bottom of the refining chamber. Impure oil is daily added through the pipe 16 forcing the lighter and purer oil nearer the top of the chamber. The capacity of the refining chamber to the amount of oil to be treated is calculated so that the first day's oil will flow over into the standpipe at or about the sixth day. The pure oil passes down through the standpipe, up through the water in the bottom of the filter and through and around the sediment tray to the reservoir above, from which it is drawn as required.

When it is necessary to clean the filter, which will only be required at long intervals, enough water is poured into the refining chamber to flood out all the oil. The water in the refining chamber can then be drawn off through cock 19, and the dirt emptied out. Nearly all the impurities will be precipitated in this refining chamber, and the small residium left will be deposited upon the sediment tray. This can be effectually cleaned by pulling up the standpipe which draws with it the sediment tray. The oil will pass through the openings $b$—, $b$—, in said tray and around its margin. The effect is practically to pull out for cleaning the entire bottom of the filter.

If it is desired to use the filter as a reservoir for oil not requiring treatment, this can be introduced directly into the reservoir through the pipe 12.

The advantages of my construction are now quite obvious; there is no filtering material to be renewed; the filter is cleansed with great ease, and by having the refining chamber at the top and a cooling chamber at the bottom, the oil is applied quite cool to the bearings, a fact which is of significance to an engineer.

I claim—

An oil filter having a heating chamber at the top, said chamber having an inlet pipe extending nearly to the bottom of said chamber and an outlet pipe extending from near the top of said chamber through the bottom thereof; a cooling chamber at the bottom of said filter and a pipe connecting said cooling chamber with the outlet pipe of the heating chamber.

In testimony whereof I have hereunto set my hand this 25th day of April, A. D. 1892.

ALBERT C. DARRAGH.

Witnesses:
J. H. BEAL,
WM. L. PIERCE.